US012367030B2

(12) United States Patent
Shaastry et al.

(10) Patent No.: US 12,367,030 B2
(45) Date of Patent: *Jul. 22, 2025

(54) SOFTWARE DEPENDENCY MANAGEMENT

(71) Applicant: Khoros, LLC, Austin, TX (US)

(72) Inventors: Santosh Shaastry, Bengaluru (IN); Narendra Prabhu Gurusiddappa, Mysuru (IN); Gunaalan Srinivasan, Alagappapuram (IN); Neel Millind Renavikar, Karad (IN)

(73) Assignee: Khoros, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,656

(22) Filed: Jul. 31, 2023

(65) Prior Publication Data

US 2024/0211235 A1    Jun. 27, 2024

Related U.S. Application Data

(63) Continuation of application No. 16/953,310, filed on Nov. 19, 2020, now Pat. No. 11,714,629.

(51) Int. Cl.
*G06F 8/65* (2018.01)
*G06F 8/41* (2018.01)
*G06F 8/71* (2018.01)
*G06F 8/75* (2018.01)
*G06F 16/2457* (2019.01)

(52) U.S. Cl.
CPC .............. *G06F 8/65* (2013.01); *G06F 8/433* (2013.01); *G06F 8/71* (2013.01); *G06F 8/75* (2013.01); *G06F 16/24578* (2019.01)

(58) Field of Classification Search
CPC ................. G06F 8/65; G06F 8/71; G06F 8/75
See application file for complete search history.

(56) References Cited

U.S. PATENT DOCUMENTS

| 8,707,297 | B2 * | 4/2014 | Brown | ...................... G06F 8/65 |
| | | | | 717/178 |
| 2009/0328025 | A1 * | 12/2009 | Johnson | ................... G06F 8/71 |
| | | | | 717/170 |
| 2013/0275958 | A1 * | 10/2013 | Ivanov | ...................... G06F 8/61 |
| | | | | 717/174 |
| 2017/0187838 | A1 * | 6/2017 | Sankaranarasimhan ..................... |
| | | | | H04L 67/34 |
| 2019/0129701 | A1 * | 5/2019 | Hawrylo | .................. G06F 8/71 |
| 2021/0056006 | A1 * | 2/2021 | Mahajan | ................ G06F 8/427 |

* cited by examiner

*Primary Examiner* — Duy Khuong T Nguyen

(57) ABSTRACT

Techniques for software dependency management are described, including receiving a query at a repository configured to store a file identifying a dependency between an application and an update, the query being configured to request retrieval and implementation of the update with the application, parsing the query to identify the update and a version of the update configured to modify the application, generating a ranking associated with the update and the version using output from a machine-learning module configured to be trained against data associated with a community, and other data associated with analyzing an issue associated with the update or the version, providing a response to the query, receiving another query requesting the update or the version, retrieving the update and the version, and implementing the update or the version, the update or the version being implemented in response to the another query.

20 Claims, 10 Drawing Sheets

SOFTWARE DEPENDENCY MANAGEMENT

CROSS-REFERENCE TO RELATED APPLICATION

This nonprovisional patent application is a continuation application of copending U.S. patent application Ser. No. 16/953,310, filed Nov. 19, 2020 and entitled, "SOFTWARE DEPENDENCY MANAGEMENT," all of which is herein incorporated by reference in its entirety for all purposes.

FIELD

The present invention relates generally to computer science, data science, and data analytics. More specifically, techniques for software dependency management are described.

BACKGROUND

In software development where various software modules, programs, or applications are often designed, configured, and implemented to work compatibly, there is a significant and substantial problem, often referred to as "dependency hell." This is a colloquial term often used to describe costly and time-consuming activities that software developers, programmers, engineers, and architects spend finding, identifying, correcting, and fixing updates to inter-relationships often found in source code between different programs that rely upon each other to properly run (i.e., execute). These are typically referred to as "dependencies" and frequently require updating even after an initial dependency has been addressed.

Conventionally, software (regardless of whether local, remote, or distributed (e.g., cloud-based)) uses or relies upon other software to function, thus creating a dependency. When updating dependencies in source code, conventionally, application programming interfaces or other software are used to transfer data in a compatible fashion to permit interoperability. Software developers, programmers, engineers, and architects (hereafter "developers") typically manually locate updates, review data and information about prior uses of the updates (including community developer/user information or feedback), install/implement updates, and, frequently, fix or replace updates that are incompatible (i.e., erroneous).

Conventional solutions often require extensive manual work performed by a software developer to identify and configure these dependencies, which is both time consuming and expensive, but also slows application development. Dependencies are critical and vital to the design, architecture, and operation of simple and complex software that often use other elements or components such as those found in networked or cloud-based programs, applications, or platforms, many of which require specific versions in order to achieve compatibility, integrity, and operability. However, checking for dependencies and ensuring that desired versions are properly installed can, as mentioned above, be an expensive and time consuming effort leading to increased development costs, expense, and delay, which can be detrimental or harmful to end users and consumers that are increasingly using networked applications and platforms to fulfill important, if not vital, individual and organizational needs. Conventional solutions and approaches to manually updating software dependencies typically result in lost productivity, which dramatically slows design, build, and run-time cycles for software product releases. Conventional solutions lead to increased user and organizational costs and longer development cycles, which consequently hinder innovation, adoption, and successful commercialization.

Thus, what is needed is a solution for managing software dependencies, without the limitations of conventional techniques.

BRIEF DESCRIPTION OF THE DRAWINGS

Various embodiments or examples ("examples") are disclosed in the following detailed description and the accompanying drawings.

DETAILED DESCRIPTION

Figure 1:
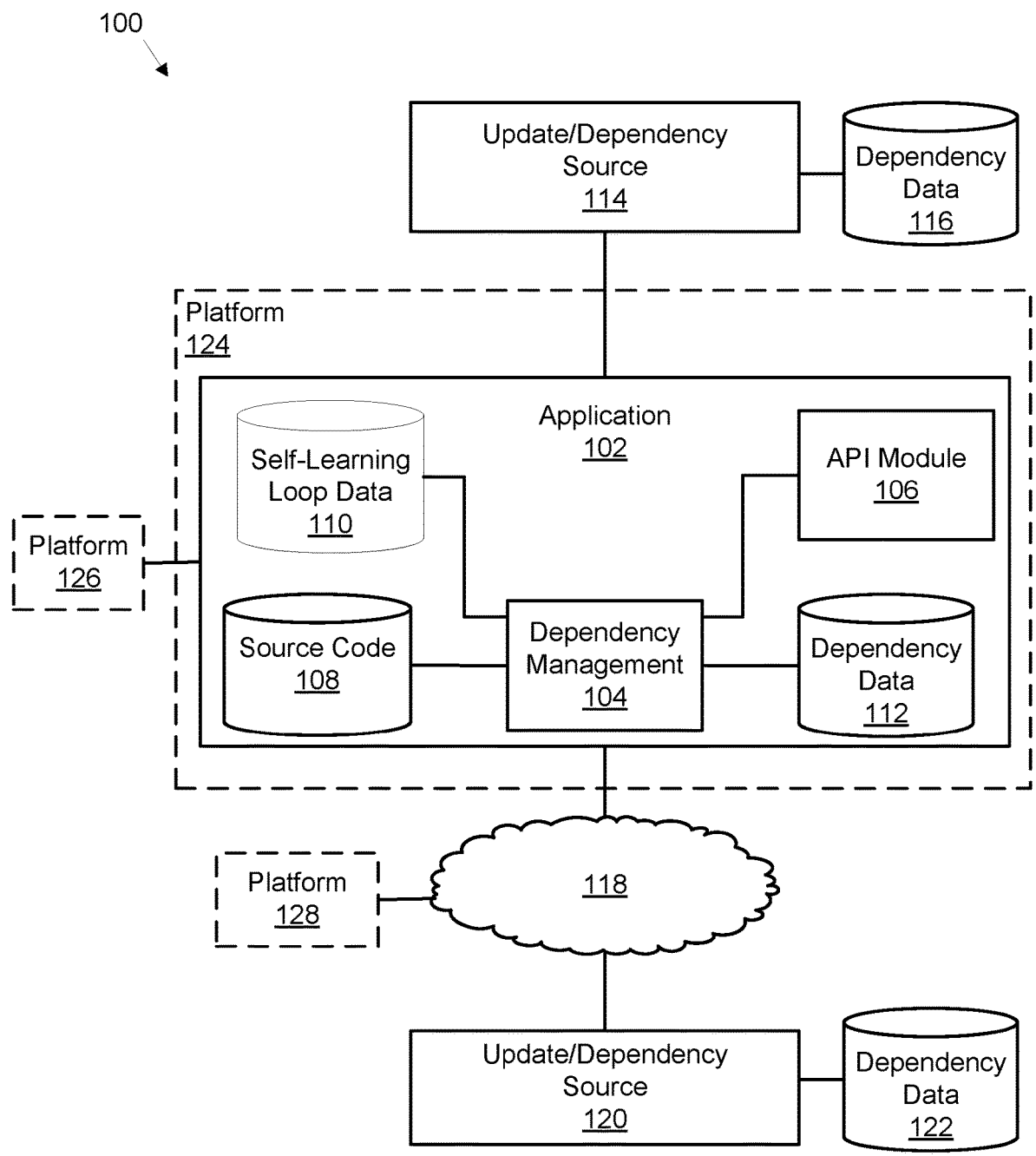
FIG. 1 illustrates an exemplary system for software dependency management.

Various embodiments or examples may be implemented in numerous ways, including as a system, a process, an apparatus, a user interface, or a series of program code or instructions on a computer readable medium such as a storage medium or a computer network including program instructions that are sent over optical, electronic, electrical, chemical, wired, or wireless communication links. In general, individual operations or sub-operations of disclosed processes may be performed in an arbitrary order, unless otherwise provided in the claims.

A detailed description of one or more examples is provided below along with accompanying figures. This detailed description is provided in connection with various examples, but is not limited to any particular example. The scope is limited only by the claims and numerous alternatives, modifications, and equivalents. Numerous specific details are set forth in the following description in order to provide a thorough understanding. These details are provided for the purpose of illustrating various examples and the described techniques may be practiced according to the claims without some or all of these specific details. For clarity, technical material that is known in the technical fields and related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture using various computing resources that are configured to provide computing features, functions, processes, elements, components, or parts, without any particular limitation as to the type, make, manufacturer, developer, provider, configuration, programming or formatting language (e.g., JAVA®, JAVASCRIPT®, and others, without limitation or restriction), service, class, resource, specification, protocol, or other computing or network attributes. As used herein, "software" or "application" may also be used interchangeably or synonymously with, or refer to a computer program, software, program, firmware, or any other term that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Further, "platform" may refer to any type of computer hardware (hereafter "hardware") and/or software using one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration. In the drawings provided herewith, the relative sizes and shapes do not convey any limitations, restrictions, requirements, or dimensional constraints unless otherwise specified in the description and are provided for purposes of illustration only to display processes, data, data flow chart, application or program architecture or other symbols, as described in this Specification.

As described herein, structured and unstructured data may be stored in various types of data structures including, but not limited to databases, data repositories, data warehouses, data stores, or other data structures and facilities configured to manage, store, retrieve, process calls for/to, copy, modify, or delete data or sets of data (i.e., "datasets") in various computer programming languages and formats in accordance with various types of structured and unstructured database schemas and languages such as SQL®, MySQL®, NoSQL™, DynamoDB™, R, or others, such as those developed by proprietary and open source providers like Amazon® Web Services, Inc. of Seattle, Washington, Microsoft®, Oracle®, Salesforce.com, Inc., and others, without limitation or restriction to any particular schema, instance, or implementation. Further, references to databases, data structures, or any type of data storage facility may include any embodiment as a local, remote, distributed, networked, cloud-based, or combined implementation thereof, without limitation or restriction. In some examples, data may be formatted and transmitted (i.e., transferred over one or more data communication protocols) between computing resources using various types of wired and wireless data communication and transfer protocols such as Hypertext Transfer Protocol (HTTP), Transmission Control Protocol (TCP)/Internet Protocol (IP), Internet Relay Chat (IRC), SMS, text messaging, instant messaging (IM), WiFi, WiMax, or others, without limitation. Further, as described herein, disclosed processes implemented as software may be programmed using JAVA®, JAVASCRIPT®, Scala, Perl, Python™, XML, HTML, and other data formats and programming languages, without limitation. As used herein, references to layers of an application architecture (e.g., application layer or data layer) may refer to a stacked layer application architecture designed and configured using models such as the Open Systems Interconnect (OSI) model or others.

In some examples, various examples of process and apparatus-based implementations include techniques for identifying, managing, and automatically configuring dependencies, regardless of type (e.g., chained, serial, or others), in source code, without limitations or restrictions due to various types of structures, formats, or programming languages, including platforms, applications, interfaces (e.g., Application Programming Interfaces (i.e., "API's), and the like, regardless of application layer or other parameters. In some examples, the techniques may be implemented as a tool used in software development, hosted on one or more local or networked computing devices such a server, group of servers, group of logical computing resources (regardless of physical locale or geographic distribution if individual resources (e.g., servers, computers, or the like), and as single or multiple-instances using one or more processors, servers, or machines (i.e., physical or virtual) without regard to being single or multi-threaded (i.e., to permit multiple parallel instances to run/execute at substantially similar times). As used herein, described techniques may also be implemented using a local instance/implementation or a distributed topology, such as a distributed data network using resources in data connection with each other, directly or indirectly, over a network such as a computing cloud or cloud-based data network (hereafter referred to as a "cloud").

The described techniques may be implemented as a software-based application used to manage, address, resolve, upgrade, or update (hereafter "update") dependencies found in source code. In some examples, the described techniques may be used as a software development "tool" to check (i.e., manually, semi-automatically, or automatically) source code (e.g., program, platform, or application code, before or after compilation) to identify and update dependencies. For example, the described techniques may be used to check for source code dependencies between different software source code found in modules, applications, programs, platforms, or the like. As another example, the described techniques may be designed, configured, and implemented to automatically upgrade software versions of dependencies in order to achieve compatibility between different software (i.e., some software dependencies may be more compatible (i.e., having fewer or no errors after updating dependencies and compiling source code)). The described techniques may also include the use of computing logic, rules, machine learning (e.g., deep learning), and/or other algorithms configured to analyze, evaluate, learn, train, or otherwise process dependency information that is identified in source code (i.e., regardless of computing or programming language, formats, data schemas, data communication and/or transfer protocols or the like).

In some examples, dependencies can be automatically and rapidly addressed, often using suggested or recommended applications, programs, or source code that have compatible dependencies as identified by built-in logic implementing, in some examples, machine and/or deep learning algorithms.

In other examples, a software-based dependency management tool may be configured to automatically upgrade a compatible version of a dependency if, once identified, a newer or preferred version of an update is determined based on machine-learning algorithms that have been trained to identify such against prior updates. In other words, prior installed versions found to be compatible (i.e., having few or no errors when source code with updated dependencies (hereafter "updated source code") has been compiled and/or run)) may be automatically identified, retrieved, and implemented based on attributes such as compatibility. In other examples, data, metadata, and other information associated with a given implementation may be identified as attributes and stored in a data source (e.g., data repository, database, data warehouse, or any other type of data storage facility) for use in training one or more machine learning (e.g., deep learning, supervised, unsupervised, or others, without limitation or restriction) algorithms and, when (subsequent) queries are received for a similar dependency. In some examples, machine or deep learning algorithms such as those used in artificial intelligence may be used. While there is no particular dependency to a given or single machine or deep learning algorithms, there is likewise no requirement that only a single algorithm be used to implement a dependency management tool. Further, there are no restrictions or limitation as to the type of machine learning and/or deep learning algorithms used to process dependency information. As an example, machine-learning algorithms may be trained to analyze attributes of prior implementations of updates to dependencies. When a request to update a dependency is received, a machine-learning algorithm(s) as part of a self-learning loop (or module thereof) can be structured and configured to parse and evaluate a query to identify attributes for a requested update and search for matching attributes (determined from prior updates) in order to present and rank update options for a given dependency.

In other examples, the described techniques may also include processes for identifying incompatibilities between updates for dependencies. Incompatibilities may be due to errors resulting from prior updates (i.e., implementations of updates to dependencies), incompatible programming languages or formats, incongruous or incompatible data types, formats, structures, or the like, and other errors determined (i.e., identified as a result of computing operations performed to analyze data, metadata, attributes, information, or the like) from implementations of updates to software dependencies (hereafter "dependencies"). When errors are detected, various types of messages may be displayed. For example, various types of display statuses (including, but not limited to error messages) may be presented on a user interface such as "no change," "auto updated," "partial update," "partially updated," "needs attention," or others, without limitation or restriction. As another example, historical data from prior updates may be used as a data input to an instance of the described techniques as a software-based tool used to manually, semi-automatically (i.e., limited user intervention or input), or automatically manage, fix, or update (hereafter "update") dependencies between source code for different computer programs, applications, modules, or platforms (hereafter "code").

Other techniques described may be directed to "smart pull" workflow software modules that are structured (e.g., programmed) to find, retrieve, and implement updates determined based on prior pull requests, but doing so based on identifying, comparing, and matching attributes between current and prior pull requests, in order to automatically implement (i.e., include or write to code updates that address dependencies) that are determined by one or more machine-learning algorithms (trained against data of prior pull requests) to be compatible (e.g., error-free or having an error rate or number of errors below a given quantitative threshold determined by a self-learning loop module or by user input). The described techniques improve productivity (i.e., by reducing the amount of developer time spent manually identifying updates to correct dependencies by trial-and-error and without recourse for addressing incompatibilities apart from manually searching for updates) by increasing predictability, compatibility, and faster resolution of incompatible dependencies, using trained machine learning computing facilities (e.g., modules, algorithms, and the like).

In other examples, updates may be ranked by a ranking module that evaluates input data and attributes from dependency updates (i.e., "updates"). As used herein, "update" may refer to any code (e.g., source, object, or otherwise) that is used to configured, change, or modify other code and, in some examples, may have different versions, one, some, or all of which may be requested, retrieved, and implemented using the techniques described herein. In some examples, update rankings may be generated or modified by user input received at an interface (e.g., rules, thresholds, limits, restrictions, fields, attributes, or the like). In other examples, updates identified by data stored in a data source (e.g., a repository) may be identified upon receipt of a query or request for a given dependency and presented (i.e., displayed) in a user interface as ranked options for updating the dependency. In some examples, the flow of data between a machine-learning module, ranking module, a data source, and a user interface (i.e., receiving input data from a repository and providing user input to the data management tool) may be described as a self-learning loop, which may be implemented as a standalone or distributed (e.g., cloud or network-based) instance using one or more computing and networking resources. Further, a ranking module, as an element (i.e., component) of a software dependency management tool (hereafter "tool") be implemented using one or more algorithms, one or more of which may also be implemented using machine or deep learning algorithms.

In some examples, a tool using the techniques described herein can also identify and determine specific versions or builds of a given program with a compatible dependency to a software application, platform, or other instance of source code under development. If more recent versions of a given dependency (i.e., program, application, platform, or the like) is available, the techniques described herein may be implemented with a feature or functionality that can make a recommendation or suggestion (i.e., of software code that has a compatible dependency) to conform or fix code dependencies with source code under development. Ultimately, the described techniques are intended to evaluate compatibility of dependencies between different code (e.g., one computer program being dependent on another computer program) and consequently updating dependencies using self-learning loop logic such as that described herein. Regardless, the described techniques are not limited in implementation, design, function, operation, structure, configuration, specification, or other aspects and may be varied without limitation.

FIG. 1 illustrates an exemplary system for software dependency management. Here, system 100 includes application 102, dependency management module 104, application programming interface (hereafter "API") module 106, source code/data source 108, self-learning data repository 110, dependency data repository 112, update/dependency source 114, dependency data 116, network 118, update/dependency source 120, dependency data 122, and platforms 124-128. In some examples, application 102 may be designed, configured, modified, and/or used to identify and update (i.e., retrieve and install program code (e.g., source, object, or the like) for a dependency. As used herein, a "software dependency" or "dependency" may be an instance in which an application that incorporates, integrates, or uses (hereafter "uses") another program to run (i.e., compile and/or execute) and function without error or below a given threshold for errors (i.e., at an acceptable error rate) also uses a type of application (e.g., software program, computer program, program, or the like) to implement, upgrade (i.e., to a different version or build), or update (hereafter "update") the update to ensure interoperability (e.g., using code to ensure correct calls, instances, APIs, or other interconnecting software is installed in a program), consistency, continuity, and operability of the application undergoing software development.

For example, application 102, when run, may be configured to invoke dependency management module 104 to identify and update dependencies in source code (i.e., copies of which may be stored in source code repository 108) using dependency(s) retrieved from update/dependency source 114 or 120. When an update is performed, in some example, data, metadata, attributes, and information associated with the update (i.e., implementation) may be stored in dependency data 112. As shown, source code undergoing software development may be stored in a repository such as source code 108 or in a network or cloud-based repository (e.g., data storage facility, warehouse, database, or other type of repository, without limitation or restriction, including using database management systems (not shown)). In some examples, application 102 may be invoked manually (i.e., by a software developer, engineer, or other user using a graphical user interface configured to receive an input or instruction (not shown)), semi-automatically, or automatically (e.g., rules-initiated, machine or deep learning algorithmically-initiated, or others, without limitation or restriction) to identify and update dependencies between source code 108 of a given program undergoing development and another program, application, platform, or the like.

Here, application 102 may be implemented as an application, component, module, element of platform 124. In some examples, application 102 may be configured as a standalone application or tool used to identify and update software dependencies, for example, in platforms 124-128, which may be in direct (e.g., local) or indirect (e.g., using a data network or cloud such as network 118) data communication. Platforms 124-128 are shown outlined in broken line to illustrate these may be alternative implementations of operating or computing environments in which the described techniques may be implemented (e.g., application 102). In other examples, application 102 and the processes, functions, and structures described herein may be implemented differently.

In some examples, application 102 may be invoked (e.g., receive a command to run, invoke an instance, execute, or otherwise cause to operate) to identify and update dependencies within a software development project (e.g., source code 108 or other source code being written, compiled, edited, built, or other operations). As part of a software development environment or platform (e.g., platform 124-128), application 102, when invoked, may send a message, using any type of database language or format (regardless of whether a message includes an instruction to store, add, retrieve, delete, or modify structured or unstructured data) from dependency management module 104 to dependency data 112. Further, dependency management module 104 may also query self-learning loop data repository 110, which may, in some examples, invoke further modules such as machine or data learning algorithms, rules, logic, or other modules that generate data and/or signals that provide additional information that may be used by dependency management module 104 to identify, select, rank, prioritize, or perform other data operations on source code 108. Upon identifying dependencies in source code 108, dependency management module 104 may send another message, query, request, or the like (via a data communication link or module such as API module 106) to update/dependency source 114 or 120 in order to retrieve source, object, or other program code to implement with source code 108. In some examples, dependency management module 104 may also send data and information via API module 106 to a user interface (not shown) providing available updates to be selected as a ranking, list, or other presentation format, without limitation or restriction. A user, in some examples, may then select an update(s) from update/dependency source 114 and/or 120 by generating and sending (e.g., transmitting) a data response or reply (hereafter "response") to dependency management module 104 identifying updates to be selected and implemented.

As described in greater detail below, updates to be presented may be ranked, listed, or otherwise presented in various types of display and presentation formats. Further, dependency management module 104 may include self-learning algorithms (e.g., machine or deep learning algorithms, neural networks, or other logic, without limitation or restriction to any particular programming language, format, schema, architecture, or types (e.g., supervised or unsupervised learning algorithms run against open, closed, or proprietary data, regression, classification, clustering, association, anomaly detection, pattern-based, or others, without limitation or restriction). In some examples, "self-learning" may also refer to any type of algorithm(s) used to implement, herein, a self-learning data processing loop module (hereafter "self-learning loop module" or "self-learning loop," which may be used interchangeably without limitation or restriction) that invokes or calls (e.g., remotely or locally) machine or deep learning algorithms such as those mentioned herein and, over a given period of time, generates results that increase or improve when performing computing tasks. Quantitative determination of increased or improved performance may be measured against a given variable or set of variables that, when measured, are used to determine a level, score, threshold, benchmark, or other quantitative determinator of "performance improvement."

Referring back to FIG. 1, once updates have been retrieved from update/dependency sources 114 and/or 120 from dependency data repositories 116 or 122, respectively, the retrieved code for the selected or identified dependencies (e.g., as determined by dependency management module 104 and selected automatically or by user input received from, for example, API module 106) may be implemented with source code 108. Update/dependency source 120 and dependency data 122 are shown as an example of an update source that may be in indirect data communication with application 102 and platform 124. Likewise, platform 118 may also be in indirect data communication with application 102 and platform 124 using, for example, a data network, computing cloud (i.e., "cloud"), local area network (LAN), wide area network (WAN), or any other data network, regardless of type, topology, data communication protocol (e.g., HTTP, TCP/IP, HTTPS, and others, without limitation or restriction). Although some modules are shown optionally implemented as a component or module of platform 124 in the described example, in other examples, one or more modules may be implemented as separate, local, remote, standalone, offsite/off-premises, or other installations that are not integrated or otherwise directly coupled to application 102. In other words, application 102 and dependency management 104 may be in data communication with one or more of source code repository 108, self-learning loop data 110, or dependency data repository 112 as remote elements, modules, repositories, applications, platforms, or systems, without limitation or restriction. For example, source code repository 108 may be an open source or public code repository such as GitHub®, acquired by Microsoft Corporation of Redmond, Washington. In still other examples, the size, shape, quantity, type, configuration, function, or structure of the elements in the exemplary system shown may be varied, without limitation or restriction.

Figure 2:
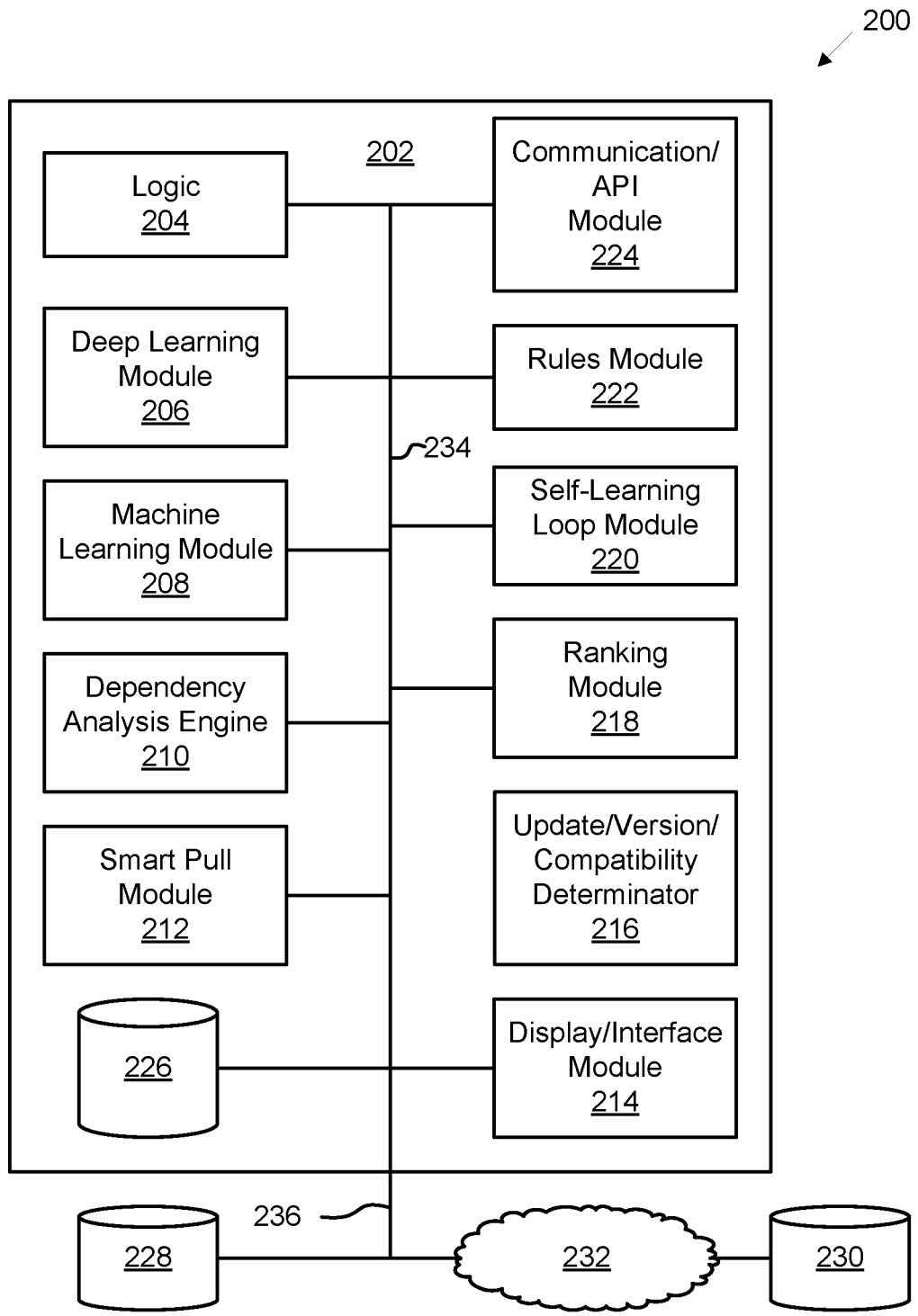
FIG. 2 illustrates an exemplary application architecture for software dependency management.

FIG. 2 illustrates an exemplary application architecture for software dependency management. Here, application 202 (which, in some examples, may be analogous in function and/or structure to application 102 (FIG. 1)) includes logic 204, deep learning module 206, machine learning module 208, dependency analysis engine 210, smart pull engine 212, display/interface module 214, update/version/compatibility determinator 216, ranking module 218, self-learning loop module 220, rules module 222, communication/API Module 224, repositories 226-230, network 232, data bus 234, and data link 236. In some examples, one or more of elements 204-224 of application 202 may transfer data, exchange signals, or otherwise be in data communication with other elements 204-224 (including repository 228 and, over network 232, repository 230). In other examples, data may be unidirectional, bidirectional, serial, parallel, or transferred using one or more data communication protocols without limitation or restriction to any particular type or instance.

As shown, application 202 may be implemented similarly in function, structure, and/or configuration to application 102 (FIG. 1) to identify and update dependencies found in software projects undergoing development. Here, logic 204 may be software or firmware implemented as a module, application, applet, script, program, or the like to generate and transfer control data and signals over data bus 234 to (internal) elements 206-226 or data communication link 236 to external elements 228-232. As show, logic 204 may be an operating system, set of rules, group of algorithms (or a single algorithm) that send data and/or signals to elements 206-226 to manage and control the identification, retrieval, and implementation of updates to source code undergoing software development (hereafter "development"). Different types of algorithms may be used to provide various functions to application 102 such as deep learning module 206, machine learning module 208, ranking module 218, and self-learning loop module 220 (described in greater detail below). As described above, various types of machine and deep learning algorithms may be used and are not limited in type, configuration, or quantity, but may be varied to implement the described techniques.

Here, dependency analysis engine 210 may be configured to evaluate a project (e.g., source code, object code, or other program code undergoing development (i.e., software development)) to identify dependencies between source code undergoing development and other software. For example, dependency analysis engine 210 may be structured as a separate, standalone application that is configured to identify dependencies by analyzing data passed through communication/API module 224, the latter of which was used in prior updates for similar or substantially similar dependencies. In some examples, dependency analysis engine 210 may also be configured to evaluate a source code project (hereafter "source code" and "project" may be used interchangeably, without limitation or restriction for all purposes within this Detailed Description) to identify dependencies and data associated with prior updates performed to other projects, including evaluating developer (i.e., users who are software developers, engineers, architects, or the like) input as to the accuracy, quality, utility, reliability, cohesion, coupling, or other attributes and characteristics associated with prior implementations of an update for a given dependency. In so doing, dependency analysis engine 210 may be in data communication (over data bus 234) with ranking module 218, cooperatively generating a ranking that may be used to sort, filter, and rank updates accordingly. In some examples, rankings may be presented on a user interface (e.g., display, presentation, or the like) by transmitting rendering and display data from display/interface module 214 to communication/API module 224 and then to one or more external displays (not shown). In other examples, rankings may be input to self-learning loop module 220, dependency analysis engine 210, or one or more of repositories 226-230, the latter of which may be any type of data storage facility, such as those described herein, and stored as "dependency data."

As an input to self-learning loop module 220, update rankings may be retrieved, requested, transmitted, transferred, or otherwise input to self-learning loop module 220, which may be configured to train machine learning algorithm(s) (e.g., machine learning module 208) and/or deep learning algorithm(s) (e.g., deep learning module 206). Machine learning module 208 and deep learning module 206, in some examples, may be trained against data and information from prior updates of source code (i.e., source code or a copy of source code under development may be stored in one or more data repositories such as a local repository (e.g., repository 226), an external repository (e.g., repository 228), or a networked repository (e.g., repository 230, which may be coupled (i.e., in data communication) via data communication link 236 to application 202. Machine learning module 208, deep learning module 206, ranking module 218, and/or rules module 222 may be called, invoked, or otherwise used by self-learning loop module 220 and update/version/compatibility determinator 216 to identify updates for various dependencies (i.e., identified by a developer or user). Update/version/compatibility determinator 216 may be implemented using different configurations to implement a sub-application or sub-tool of application 202, which is configured to evaluate an update to determine suitability for a given dependency and, if so, what version is compatible with said dependency. For example, a dependency that is based on a communication function of a project may be indicated by a developer to identify one or more updates that may be used to write source code to the overall project to fulfill the communication function or feature. Searching for updates, the update/version/compatibility determinator 216 may, in response to queries (some of which may be transmitted over communication/API module 224 to repositories 228-230), locate one or more updates stored in one or more of repositories 226-230. After or coincidental with identifying "appropriate" updates to specified (i.e., whether user or system-specified (i.e., automatic or semi-automatic)), copies of the updates may be retrieved by update/version/compatibility determinator 216. In some examples, "appropriate" may refer to a quantitative or numerical match of one or more attributes of an update for a given dependency based on evaluations performed by deep learning module 206 and/or machine learning module 208 against prior instances (i.e., installations, implementations, or uses) of similar updates or, by evaluating attributes associated with the update(s) against one or more rules (e.g., quantitative thresholds or rules) stored and managed by rules module 222 (which may also include user-specified rules provided via a user interface (not shown) to application 202 via communication/API module 224 and display/interface module 214) managed by rules module 222 and stored, in some examples, in one or more of repositories 226-230.

Here, logic 204 may be configured to send control data or signals to direct self-learning loop module 220 to update a project using the retrieved updates, using input from machine learning module 208 and/or deep learning module 206. As described here, update/version/compatibility determinator 216 may also receive input from one or more of deep learning module 206, machine learning module 208, and self-learning loop module 220 to not only identify an update, but also to identify versions and compatibility thereof. For example, update/version/compatibility determinator 216 may be configured to identify an update relative to a local copy of source code under development. Updates and local copies of source code may be stored in the same, different, or other repositories, including repositories 226-230. In some examples, update/version/compatibility determinator 216 may be an application, applet, script, or the like that is configured to determine whether a given version is compatible with code under development or, in other examples, a newer, older, or different version has a higher level of compatibility, which may be a quantitative value that is determined using various techniques such as referencing stored rules from rules module 222, input from deep learning module 206 or machine learning module 208, input from dependency analysis engine 210, ranking data from ranking module 218, and others, without limitation or restriction.

Also, in other examples, application 202 may be configured to automatically implement pull requests using smart pull engine 212, which may be configured to query, request, and retrieve data on prior pull requests from one or more of repositories 226-230. As used herein, a "pull request" may be an update that was previously committed to a local version of source code (e.g., stored in repository 226) under development, but the updates are also submitted for review and possible merging (i.e., implementation) with other copies of the same or similar source code, updates to which may be managed and maintained by another system. As shown, smart pull engine 212 may be configured to automatically search for, request, retrieve, merge, and commit pull requests for code changes performed to a project based on evaluation of prior pull requests, which may also be evaluated (similarly to updates) by deep learning module 206, machine learning module 208 and self-learning loop module 220.

Using machine, deep, or other types of algorithms, in some examples, application 202 may be configured (using dependency analysis engine 210 and self-learning loop module 220) to identify updates, evaluate compatibility of an update(s) relative to code undergoing development and modification to support or commit code changes for dependencies, which may be based on rankings from prior implementations of ranked updates, manually (e.g., presenting update rankings and receiving input from a user (i.e., developer) indicating selection of one or more updates to be installed, integrated, or otherwise written to source code under development), semi-automatically, or automatically (e.g., ranked updates, when determined, are identified in data and/or signals (e.g., voltage, current, optical, or chemical signaling) transferred to/with dependency analysis engine 210, ranking module 218, and self-learning loop module 220). Using self-learning loop module 220, code modifications and commits for dependencies can be rapidly implemented and managed by eliminating manual review and searching as well as trial-and-error implementations (hereafter "commits" and "implementations" may be used interchangeably for all purposes) of updates. In other examples, the size, shape, quantity, type, configuration, function, or structure of the elements shown in the exemplary application architecture may be varied, without limitation or restriction.

Figure 3:
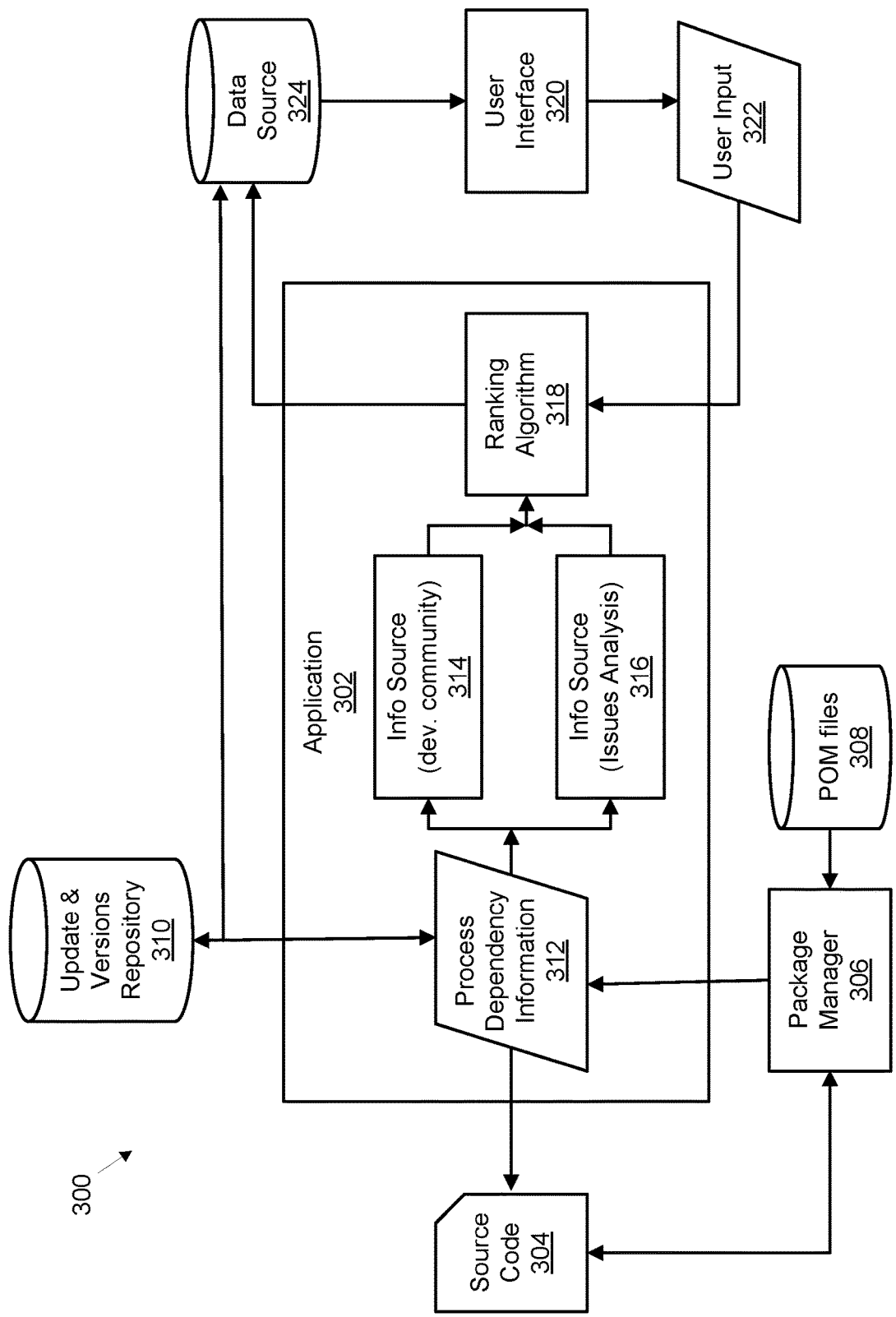
FIG. 3 illustrates an exemplary data flow process for software dependency management.

FIG. 3 illustrates an exemplary data flow process for software dependency management. Here, system 300 includes application 302, source code 304 (or a local version thereof), package manager 306, POM files 308, update and versions repository 310, process dependency information 312, information sources 314-316, ranking algorithms 318 (i.e., which may be interchangeable with ranking module 218 (FIG. 2), user interface 320, user input 322, and data source 324. In some examples, self-learning loop module 220 (FIG. 2) may be implemented using elements 318-324 as described herein. In other examples, self-learning loop module 220 (FIG. 2) may be implemented differently and is not limited to the examples provided.

Referring back to FIG. 3, application 302 is an exemplary implementation of techniques described herein for managing dependencies in software development projects. As an application, the described techniques may be implemented as a tool and structured as a standalone or sub-component, module, or element of a software development platform, configured to provide features and functionality for identifying, evaluating, updating, and improving (using self-learning techniques such as machine learning or deep learning algorithms trained against data from prior updates) updates or, in other examples, pull requests. As an example, source code 304 (or a copy thereof) may be evaluated by package manager 306, which is configured to generate and store project object model (i.e., pom files) in POM file repository 308 (e.g., POM files 308), which may be designed, configured, and implemented similar to a repository such as Apache Maven™ developed by Apache Software Foundation of Wilmington, Delaware, and others. In some examples, files stored in POM files 308 may be any type of file (e.g., .pom, yarn, and others, without limitation or restriction) that includes data or information describing dependencies found in source code undergoing development (e.g., source code 304). By evaluating project object model (or similar types) files from source code 304, package manager 306 can identify dependencies within a given project. When a query, request, or instruction is sent to application 302, package manager 306 can send one or more pom files included in process dependency information data files 312 from pom files repository 308 for source code 304. In other examples, update and versions repository 310 may be configured to store, retrieve, add, delete, modify, or perform other data operations (in various types of programming languages or formats, regardless of whether structured or unstructured) on updates stored therein.

Combined with data from information source 314 (e.g., stored input from a user/developer community using tools such as Stack Overflow, a collaborative, online software developer community-based platform from Stack Exchange Inc. of New York, New York) and other data resulting from analyzing issues in concurrent or prior update or pull request implementations stored in information source 316, process dependency information 312 may be processed and used to rank updates by ranking algorithm 318. Rankings of updates may be performed by using process dependency information 312, data from information sources 314-316, and also from user input 322 (e.g., a user specifies a particular update and/or version thereof, an input is received from user interface 320 a given threshold (e.g., compatibility score, a quantitative threshold (e.g., percentage success rate of update, percentage failure rate, and others))) from user interface 320. In some examples, when an update is installed (i.e., commit (i.e., write operation to source code 304 ("implemented")), data, attributes, characteristics, information, and other elements associated with the commit may be stored in data source 324, which may also be used by application 302 in other updates or smart pull requests (as described in greater detail below).

In other examples, application 302 may also be referred to as a "self-learning loop" (e.g., self-learning loop module 220 (FIG. 2), and as described in greater detail), which may be implemented as a standalone program or module or integrated or incorporated as an element of another application, program, or platform. As shown, application 302 (used or referenced interchangeably in this Detailed Description with the term "self-learning loop") includes ranking algorithm 318 (which may include one or more similar or different algorithms of various types, including machine learning or deep learning algorithms configured as sub-modules of ranking algorithm 318 (e.g., deep learning module 206 (FIG. 2), machine learning module 208 (FIG. 2), and others, without limitation or restriction). Here, process dependency information 312, information sources 314-316 may be used by logic such as ranking algorithm 318 to provide a logical loop that is self-learning (e.g., uses machine or deep learning algorithms that are trained against data source 324 (or other data sources)) to identify, evaluate, and rank updates based on various attributes (which may qualitative or quantitative) such as compatibility, success/failure, commit (i.e., write) time, and others, without limitation or restriction. By using self-learned data (i.e., output from deep learning module 206 (FIG. 2) or machine learning module 208 (FIG. 2), or others) such as that generated when updates (e.g., as retrieved from update and versions repository 310) are committed to source code 304 and compiled/executed, ranking algorithm 318 can use process dependency information 312, data source 324, and information sources 314-316 to generate a list or ranking of updates to be presented on user interface 320 (with said list also being stored in data source 324). In other words, ranking algorithm 318 may be implemented with machine learning-type algorithms and software, including deep learning algorithms and other types, and trained against data (i.e., "self-learning") such as that stored in data source 324, process dependency information 312, information sources 314-316, and others. In other examples, the size, shape, quantity, type, configuration, function, or structure of the elements shown in the exemplary data flow may be varied, without limitation or restriction.

Figure 4:
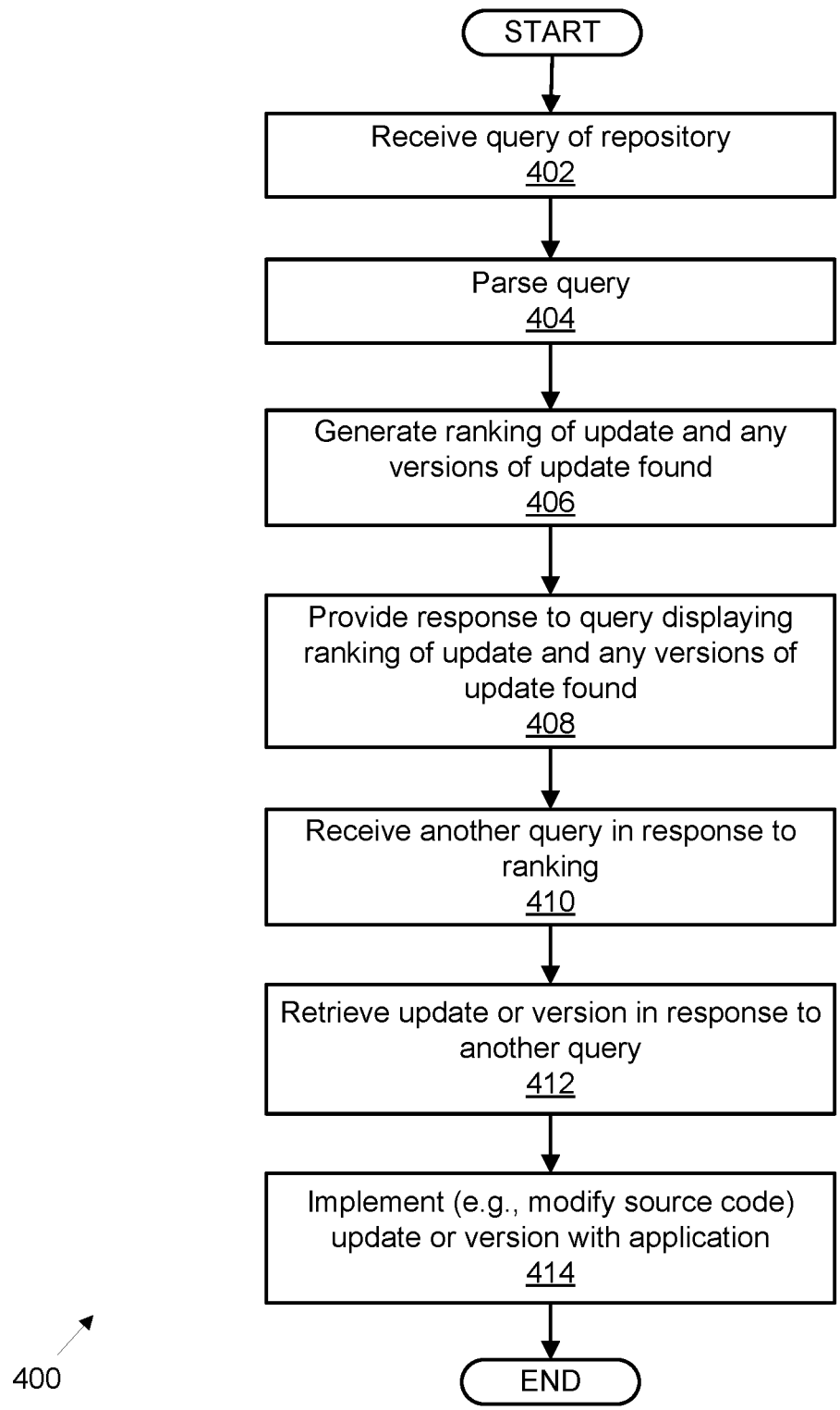
FIG. 4 illustrates an exemplary process for software dependency management.

FIG. 4 illustrates an exemplary process for software dependency management. Here, process 400 starts by receiving a query of a repository (i.e., a request for an upgrade of a given dependency as received by application 102 (FIG. 1), application 202 (FIG. 2), or as described herein) (402). Once received, the query is parsed (404). A ranking of updates identified for a given dependency and any versions thereof is generated (406). Once generated, the ranking is provided in response to the initial query, indicating updates and versions thereof (408). In further reply to the initial query, another query may be sent (i.e., from a user interface) (410). In some examples, an additional query may be an input (e.g., data or signal) received at a user interface from a user indicating selection of one or more updates to be implemented (e.g., committed, installed, written, or the like) to source code undergoing software development (e.g., source code 108 (FIG. 1), source code 304 (FIG. 3), or the like). Upon receiving, parsing, and evaluating (e.g., application 102 (FIG. 1), application 202 (FIG. 2), or the like), the additional query initiates retrieval of one or more updates in response (412). In some examples, the additional query may also be configured to identify an update and a version thereof, which may have been determined based on self-learning loop module 220 (FIG. 2) identifying a version of an update that is ranked higher than other versions based on one or more attributes (e.g., compatibility, failure, error, and other types of thresholds, rates, values, indices, or the like, without restriction or limitation). After retrieving an update and its indicated (i.e., indicated by the additional query), implementation may occur by committing or writing it to source code (e.g., source code 108 (FIG. 1), source code 304 (FIG. 3), or the like) (414). In other examples, the scope, order, configuration, function, of the elements shown in the described process may be varied, without limitation or restriction.

Figure 5:
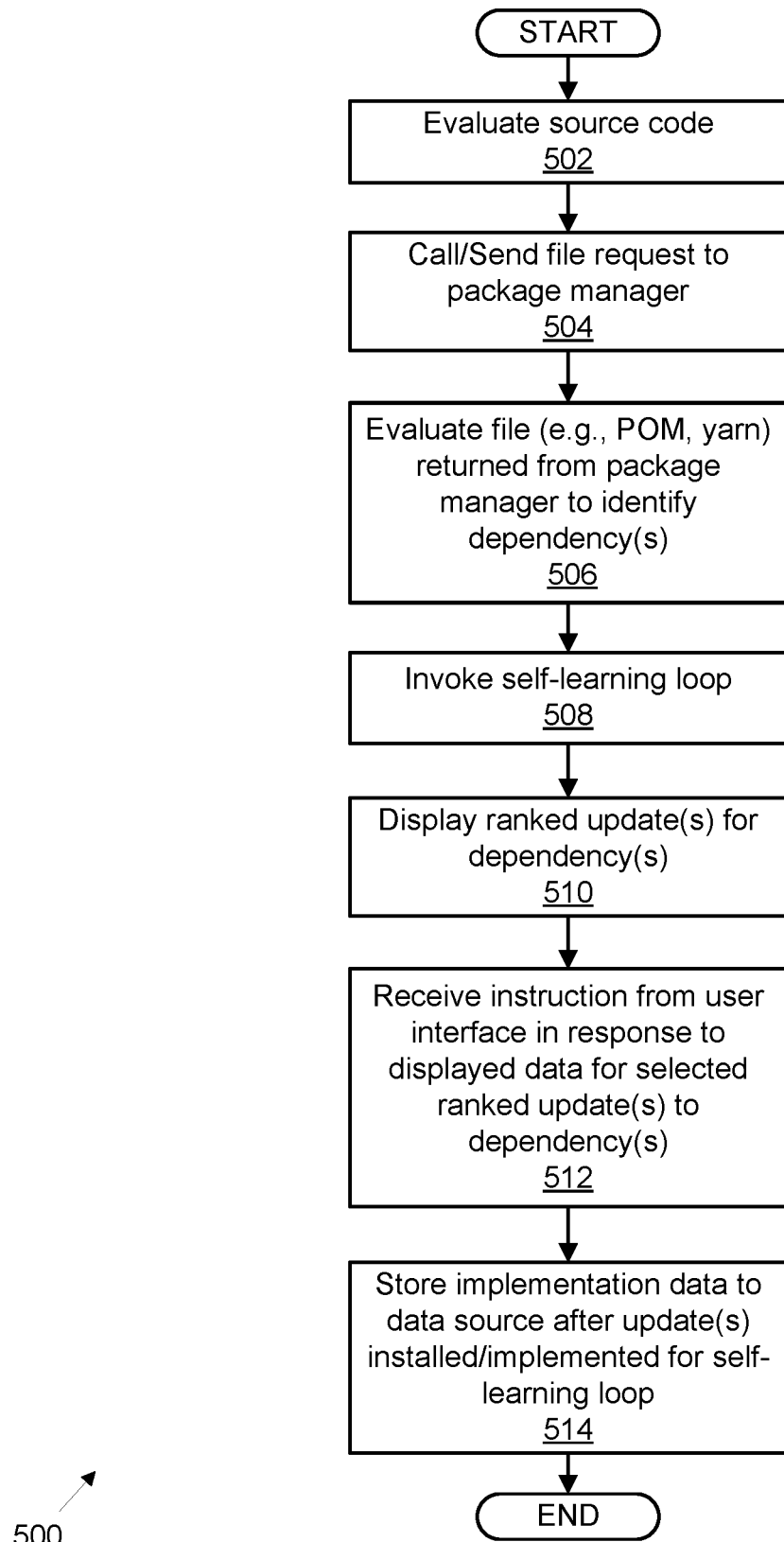
FIG. 5 illustrates another exemplary process for software dependency management.

FIG. 5 illustrates another exemplary process for software dependency management. Here, process 500 begins by evaluating source code (e.g., source code 108 (FIG. 1), source code 304 (FIG. 3), or the like) (504). Once evaluated, a call or request may be sent to a module or element configured to manage dependencies using the techniques described herein (e.g., dependency management module 104 (FIG. 1), logic 204 (FIG. 2), and others) to a package manager (e.g., package manager 306 (FIG. 3)) to retrieve a file describing dependencies in source undergoing development (504). In some examples, files requested from a package manager (e.g., package manager 306 (FIG. 3)) may be project object model, yarn, or other types of files, without limitation or restriction, such as those found in POM files 308 (FIG. 3).

Referring back to FIG. 5, once a request has been received, a response is formed including a file that is returned to the requesting source (e.g., dependency management module 104 (FIG. 1), logic 204 (FIG. 2), and others) and evaluated to identify dependency(s) in the source code undergoing development (e.g., source code 108 (FIG. 1), source code 304 (FIG. 3), or the like) (506). Once identified, a self-learning loop (e.g., dependency management module 104 and self-learning loop data 110 (FIG. 1), self-learning loop module 220 (FIG. 2), and ranking algorithm 318, user interface 320, user input 322, and data source 324 (FIG. 3), and others, without limitation or restriction) is invoked (508).

Once invoked, a self-learning loop (such as those described in this Detailed Description) may identify and rank updates (and versions thereof) for display on, for example, a user interface (e.g., user interface 320 (FIG. 3)) (510). Once displayed, a user interface may be configured to await further input that, when received, includes an instruction in response to the displayed updates and versions (or identifiers associated with each such that when a user selects an option, data or signals are transmitted from the user interface back to a ranking module (e.g., ranking algorithm 318 (FIG. 3)) as part of a self-learning loop (such as those described herein)) to select one or more of displayed, ranked updates (or versions thereof) for implementation in source code undergoing development (e.g., source code 304 (FIG. 3)) (512). Upon detecting implementation of an update (or version thereof), data associated with the implementation (e.g., data indicating that a given update or version was more compatible than another, data indicating that a given update or version was more popularly selected (despite self-learning loop-generated rankings), data indicating that a given update or version was unavailable, data indicating that a given update or version was superseded, data indicating that a given update or version was cancelled, and the like) may be stored in a data source or repository (e.g., data source 324 (FIG. 3)) and used to train logic such as machine learning algorithms, which may include other types of algorithms such as deep learning, that may be trained against data from implementations (e.g., data source 324 (FIG. 3) (514). In other examples, the scope, order, configuration, function, of the elements shown in the described process may be varied, without limitation or restriction.

Figure 6:
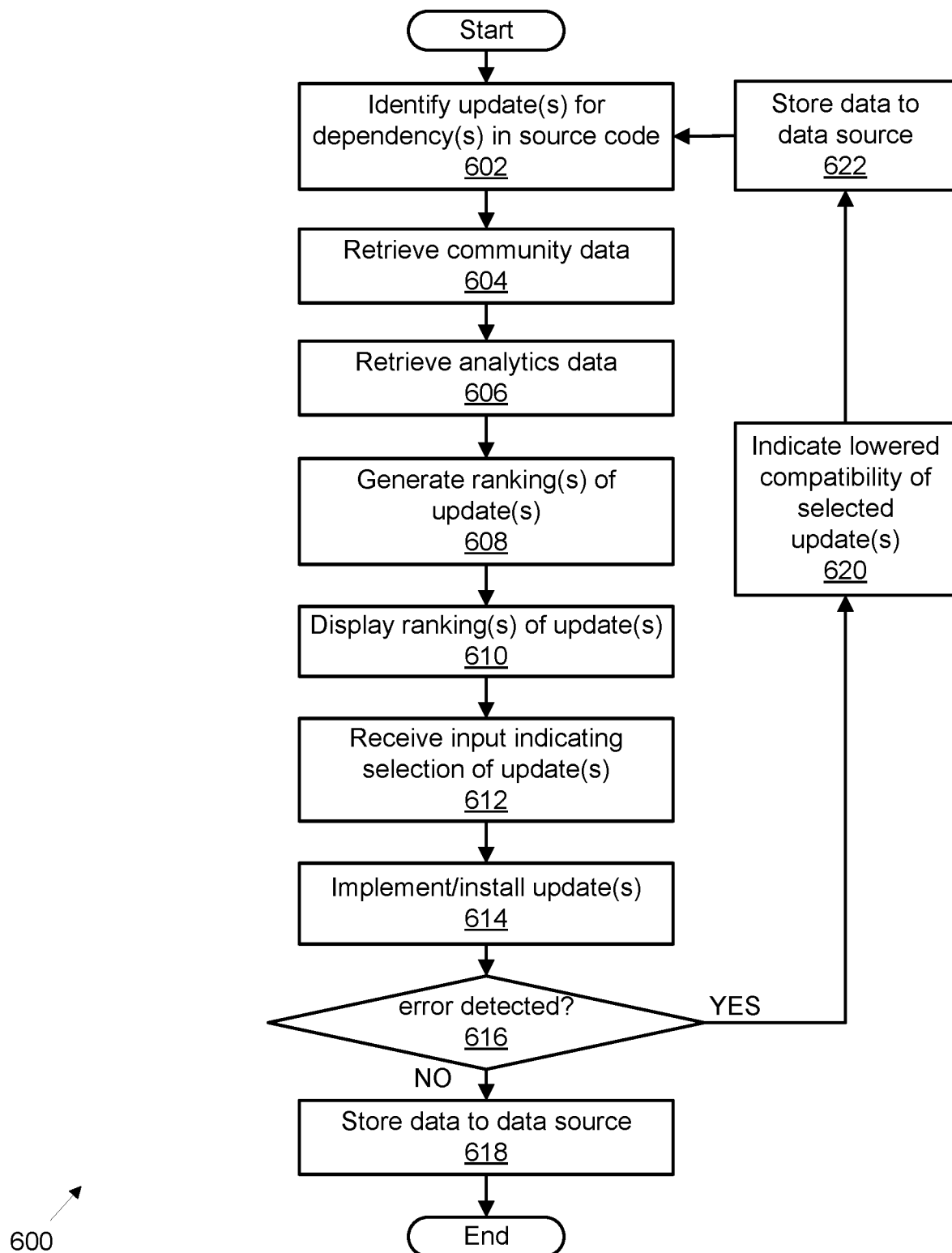
FIG. 6 illustrates an exemplary self-learning loop process for software dependency management.

FIG. 6 illustrates an exemplary self-learning loop process for software dependency management. Here, process 600 may an example of self-learning loop logic implemented by self-learning loop module 220 (FIG. 2) or as shown and described in FIG. 3. In some examples, self-learning loop logic (which may or may not be implemented as a stand-alone program, application, module, platform, or other software) starts by identifying a dependency in source code undergoing development (602). Once identified, community data (e.g., Stack Overflow™) from online software development communities, including feedback, data, attributes, and other information related to a given update or version, may be retrieved from an information source or repository (e.g., information source 314 (FIG. 3)) (606). Similarly, analytics data (i.e., data generated from analyzing issues related to the implementation of an update (or version thereof), ranging from implementation attributes (e.g., attributes related to the implementation of an update or version such as memory/storage required, update size, programming language, format, data schema, and the like, without limitation or restriction)) may also be retrieved by, for example, self-learning loop module 220 (FIG. 2) from an information source or repository (e.g., information source 316 (FIG. 3)) (606).

Using information retrieved from various repositories (e.g., data source 324 (FIG. 3), information source 314 (FIG. 3), information source 316 (FIG. 3), and others, without limitation or restriction to the examples shown and described), rankings of identified updates (and/or versions thereof) may be generated by, for example, ranking module 218 (FIG. 2), ranking algorithms 318 (FIG. 3), and others, without limitation or restriction (608). Once generated, rankings may be displayed on a user interface (e.g., user interface 320 (FIG. 3) (610).

Once displayed on user interface, rankings of updates (and/or versions thereof) may be enabled as hyperlinked or other interactive display/presentation/screen elements that, when interacted with (e.g., "clicked on"), a signal or data may be sent to self-learning loop module 220 (FIG. 2), for example, to provide an input indicating selection of an update, and/or version thereof (612). After identifying an update, implementation may occur by committing (i.e., writing) the retrieved update (and the identified version) to source code (e.g., source code 108 (FIG. 1), source code 304 (FIG. 3), or the like) (614). After implementing an update, a determination is made as to whether an error has occurred (i.e., was the implemented update compatible with the source code while also resolving the dependency) (616).

If an error is not detected, data related to the implementation may be stored to a repository such as data source 324 (FIG. 3), or the like (618). However, if the implementation of the identified, selected, and retrieved update generates an error, data related to the error (i.e., indicating lowered or non-compatibility of the update with the given source code under development) may be generated (620). The generated data of the incompatible or lowered compatibility update (and version thereof) may then be stored in a repository such as data source 324 (FIG. 3), or the like (622). Subsequently, self-learning loop logic may be enabled to repeat and await another identification of an update to a dependency to occur. In some examples, the above-described process may be performed automatically or semi-automatically in order to reduce or altogether eliminate manual intervention or input by avoiding unnecessary search and trial-and-error operations that are time consuming and costly to software development environments. In other examples, the scope, order, configuration, function, of the elements shown in the described process may be varied, without limitation or restriction.

Figure 7:
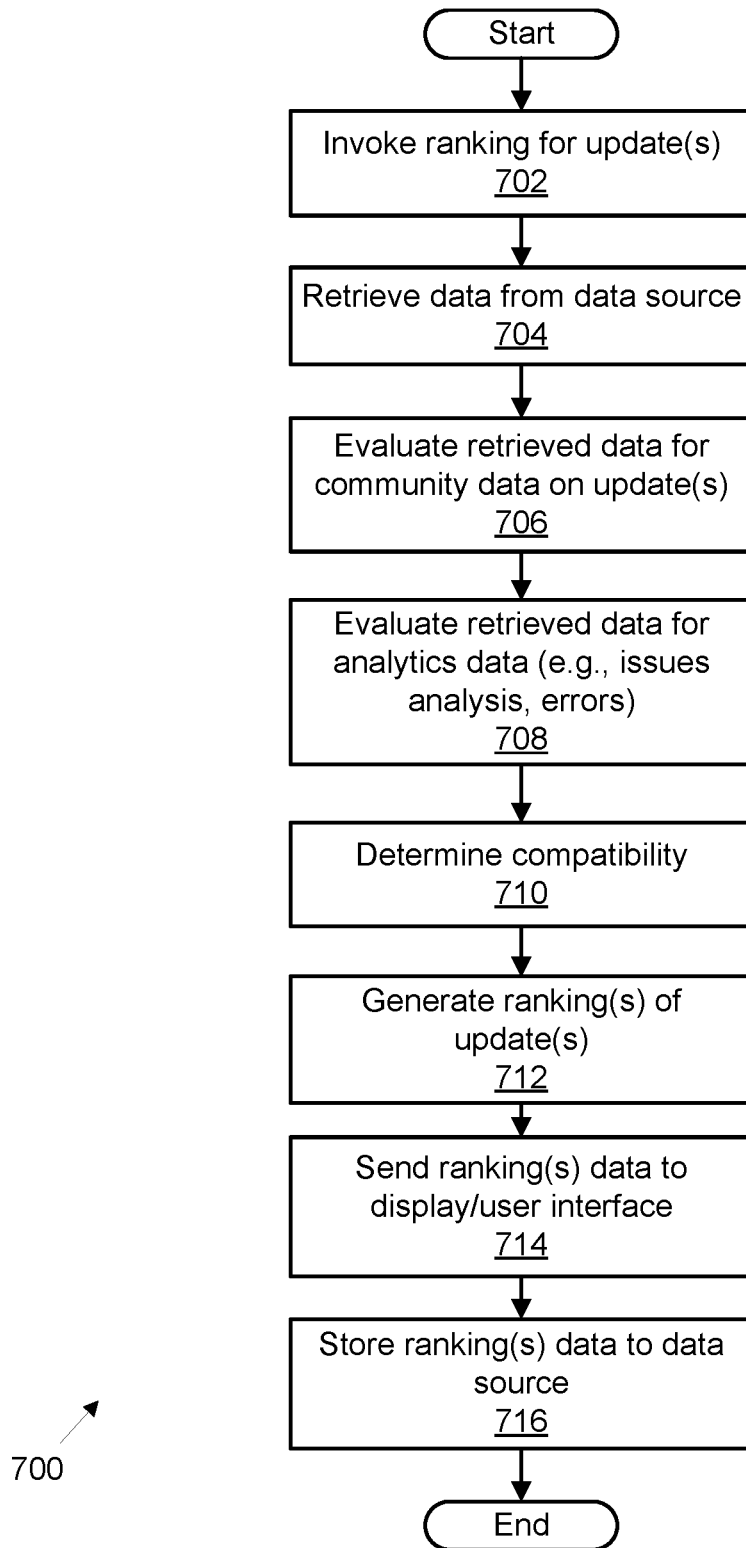
FIG. 7 illustrates an exemplary ranking process for software dependency management.

FIG. 7 illustrates an exemplary ranking process for software dependency management. Here, process 700 begins by invoking ranking module (e.g., ranking module 218 (FIG. 2)) (702). Invoking a ranking module may include invoking one or more algorithms (e.g., machine, deep, or others, without limitation or restriction) to evaluate and rank (based on user or system-specified rules that may be stored in a repository or module such as rules module 222 (FIG. 2)) updates (and/or versions thereof) that have been identified as related to or associated with a given dependency or multiple dependencies. A ranking module or process (e.g., process 700), once invoked, can retrieve data from multiple sources for use in generating rankings (704). Data such as developer community feedback or input (e.g., individual user or user groups of software developers who have used the identified update previously may provide their input via tools and platforms such as Stack Overflow™, copies of which may also be stored in a repository(s) such as information source 314 (FIG. 3)), analytics data (e.g., information source 316 (FIG. 3)) generated from evaluating or analyzing issues associated with prior implementations of a selected update, and others may be retrieved and evaluated to generate rankings. Data analyzed from developer community feedback or input may be evaluated (706) as well as data resulting from analyzing issues associated with prior implementations (i.e., issues analysis) (708).

In some examples, after evaluating dependency data (e.g., update and versions repository 310 (FIG. 3), process dependency information 312 (FIG. 3), data source 324 (FIG. 3), and the like), community developer feedback and input (e.g., information source 314 (FIG. 3)), and issues analysis data (e.g., information source 316 (FIG. 3)), a determination may be made as to compatibility of a given update for a particular dependency found (i.e., identified) in source code under development (e.g., source code 304 (FIG. 3, and others) (710). Compatibility may encompass a wide range of attributes, variables, selection criteria (e.g., criteria that may be user or system-specified that provides parameters, requirements, limitations, and/or restrictions that determine what updates are available for identification as appropriate updates for particular dependencies), characteristics, and other data that enable a self-learning loop (e.g., self-learning loop module 220 (FIG. 2), and others as described herein) to rank updates identified for given dependencies. Based on the above determinations, a ranking is generated that lists updates (and/or versions thereof) that are available for selection (712). Once identified, ranking data may be transferred from a ranking process (e.g., ranking module 222 (FIG. 2), ranking algorithm(s) 318 (FIG. 3), and the like) to a user interface (e.g., user interface 320 (FIG. 3), and the like) for display/presentation to a user (714). Further, ranking data may also be stored for use in future searches or processes that are instantiated or invoked to identify updates (and/or versions thereof) for a given dependency (716). In other examples, the size, shape, quantity, type, configuration, function, or structure of the elements shown in the described process may be varied, without limitation or restriction.

Figure 8A:
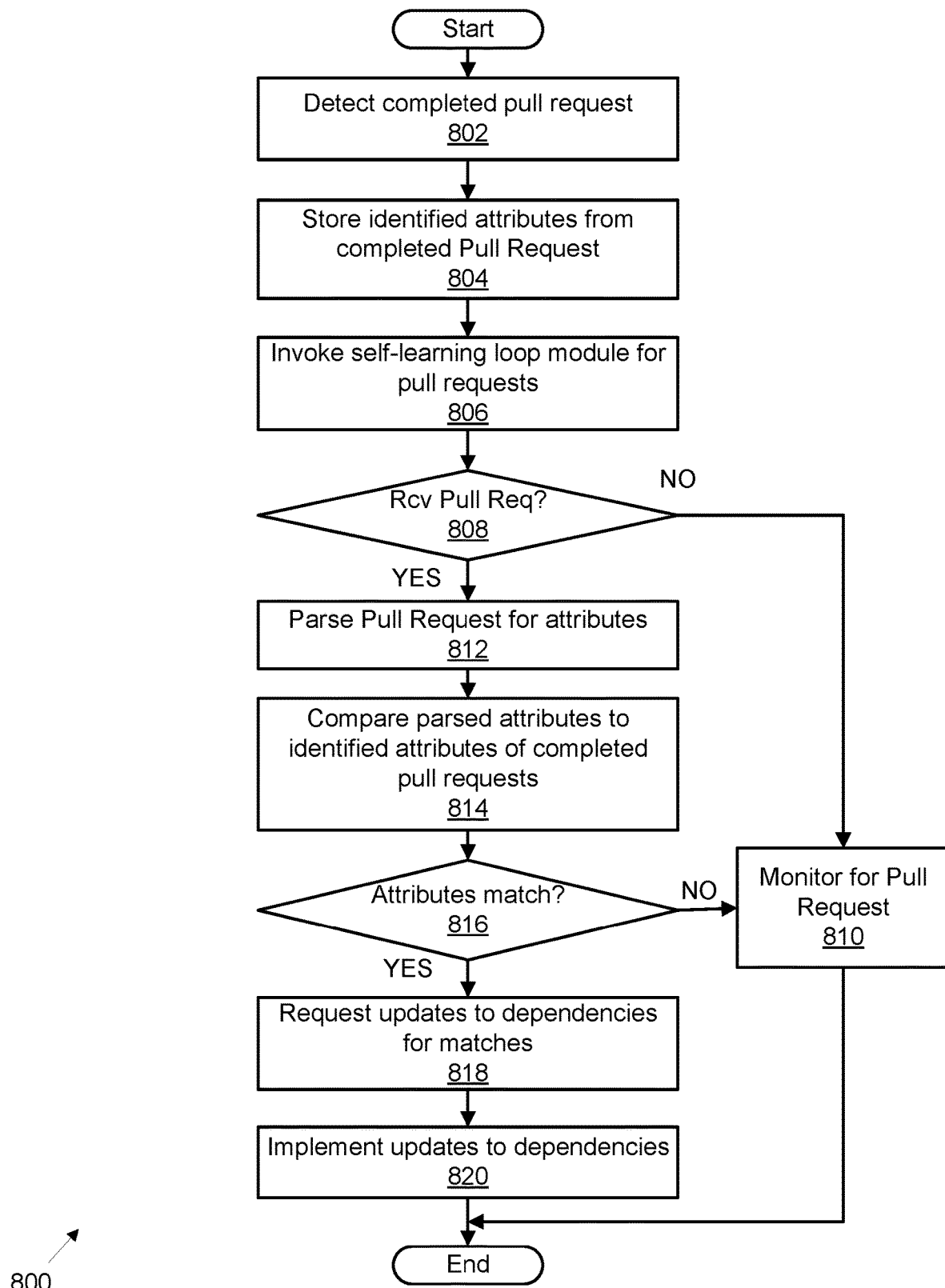
FIG. 8A illustrates an exemplary smart pull process for software dependency management.

FIG. 8A illustrates an exemplary smart pull process for software dependency management. Here, process 800 begins by detecting a pull request (802). Identified attributes (e.g., any type of data associated with a completed pull request) of the detected pull request are stored in one or more repositories or other type of data storage facility (e.g., dependency data 112, 116, 122 (FIG. 1), repositories 226-230 (FIG. 2), data source 324 (FIG. 3), or the like) (804). Next, a self-learning loop is invoked to identify, request, select, or rank completed pull requests (i.e., previously-performed/completed/committed pull requests may have data such as associated attributes and characteristics (i.e., "pull request data") that are stored in a repository (e.g., data source 324 (FIG. 3) and self-learning loop module 220 (FIG. 2), which may be configured to request/retrieve stored pull request data) (806). Pull requests, as described herein, includes updates, modifications, or changes made to source code (e.g., source code 304 (FIG. 3)), which are identified for other developers to use in similar projects (e.g., software development projects where source code is being written, developed, added, deleted, or otherwise modified); in some examples, pull requests can be "pushed" to a software development community or other platform or computing environment.

Referring back to FIG. 8A, a determination is made as to whether logic (e.g., dependency management module 104 (FIG. 1), logic 204 (FIG. 2), self-learning loop module 220 (FIG. 2), ranking algorithm 318 (FIG. 3), or others) detects a pull request has been received (808). If no pull request is received, (i.e., logic such as that described above or as found in application 102 (FIG. 1), application 202 (FIG. 2), application 302 (FIG. 3), or others) monitoring continues for the detection of a completed pull request and process 800 ends (810). Alternatively, if a pull request is received, it may be parsed by smart pull engine 212 (FIG. 2) to identify pull request data associated with previously performed, but similar pull requests (812). Once identified, parsed attributes of a detected pull request may be compared to pull request data retrieved from a repository such as data source 324 (814). In some examples, a determination may be made by comparing pull request data to parsed pull request data (e.g., attributes, characteristics, and other information) of the detected pull request by, for example, self-learning loop module 220 (FIG. 2) (816). If a determination indicates a match or matches are found above a given threshold (which may be determined quantitatively using numerical thresholds or values, or the like), then monitoring is resumed until a pull request is detected (810). However, if a determination indicates a match or matches are found are equal to or below a given threshold (the use of numerical thresholds is an example of a type of comparison that may be performed, but other examples, types, algorithms, software, applications, or other techniques for performing comparisons may be used and are not limited to the examples shown or described), then updated identified within these pull requests are requested from repositories (e.g., update and versions repository 310 (FIG. 3), data source 324 (FIG. 3), or others, without limitation or restriction to type, quantity, configuration, topology, structure, or schema) (818). Upon retrieval, implementations of updates may be performed (820). These updates, if implemented using smart pull techniques such as those described and performed (e.g., by smart pull engine 212 (FIG. 2), automatic implementation of updates (or versions thereof) may be performed without requiring significant developer time. In other words, groups or batches of updates can be performed and committed to source code (e.g., source code 304) by using the above-described process. In other examples, the scope, order, configuration, function, of the elements shown in the described process may be varied, without limitation or restriction.

Figure 8B:
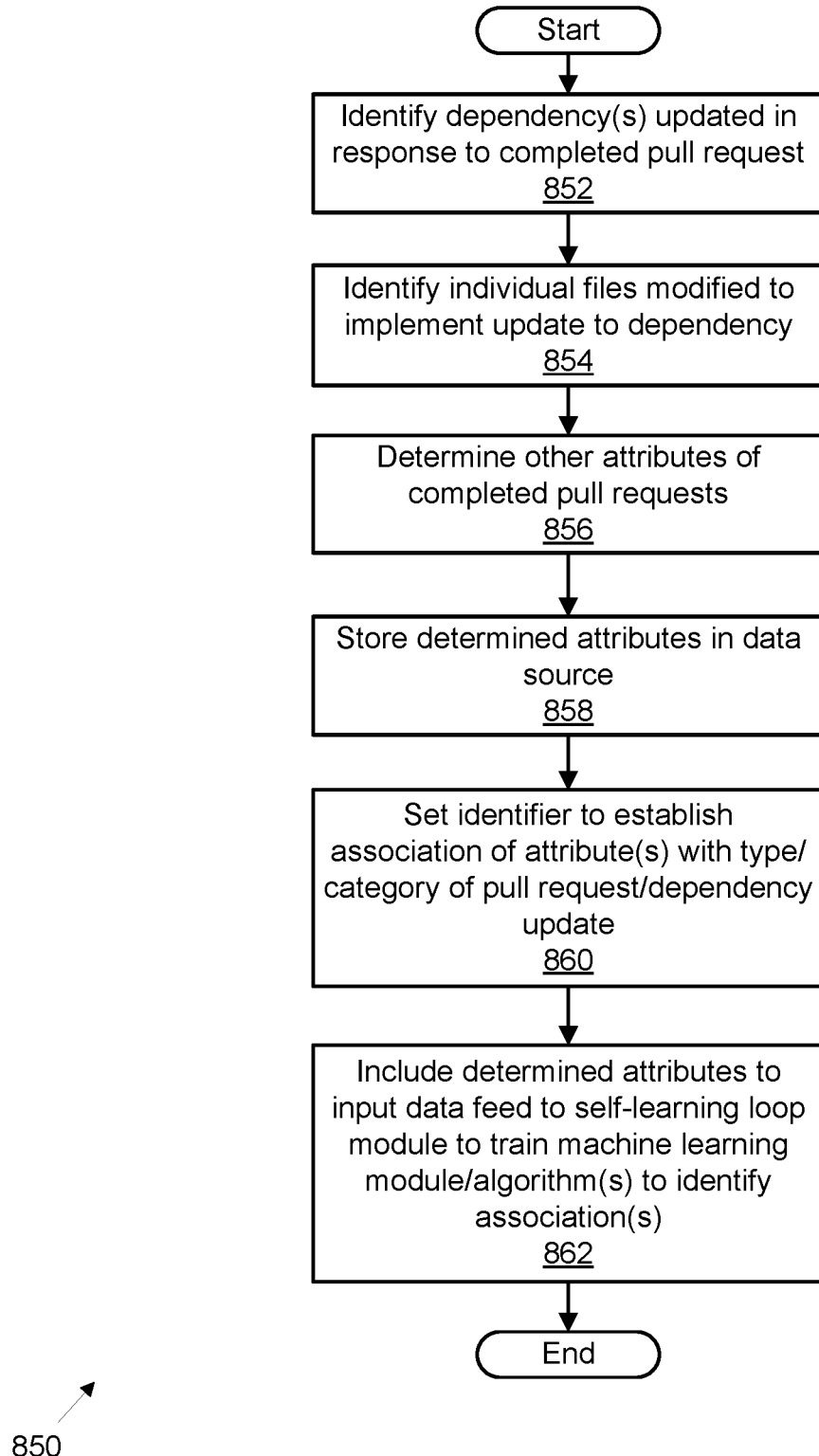
FIG. 8B illustrates an exemplary continuing smart pull process for software dependency management.

FIG. 8B illustrates an exemplary continuing smart pull process for software dependency management. Here, process 850 starts by identifying dependencies that were updated in response to a completed pull request (852). Once identified, individual files are modified to implement an update to a given dependency (854). After completing the update to source code (e.g., source code 304 (FIG. 3)), attributes such as those described above may be determined (856). Once attributes associated with a pull request have been determined, these can be stored in a repository such as data source 324 (FIG. 3) (858). Further, as an exemplary technique for identifying a set of attribute data associated with a given pull request (and updates subsumed within said pull request), an identifier may be set and stored with the pull request data in data source 324 (FIG. 3) (860). In other words, when a pull request is completed, attributes are determined and are stored with an identifier that is configured to identify and associate the pull request with, for example, a type or category of pull requests such that, in future smart pull requests, a previously completed pull request can be identified and associated updates can be retrieved. In other examples, the scope, order, configuration, function, of the elements shown in the described process may be varied, without limitation or restriction.

Figure 9:
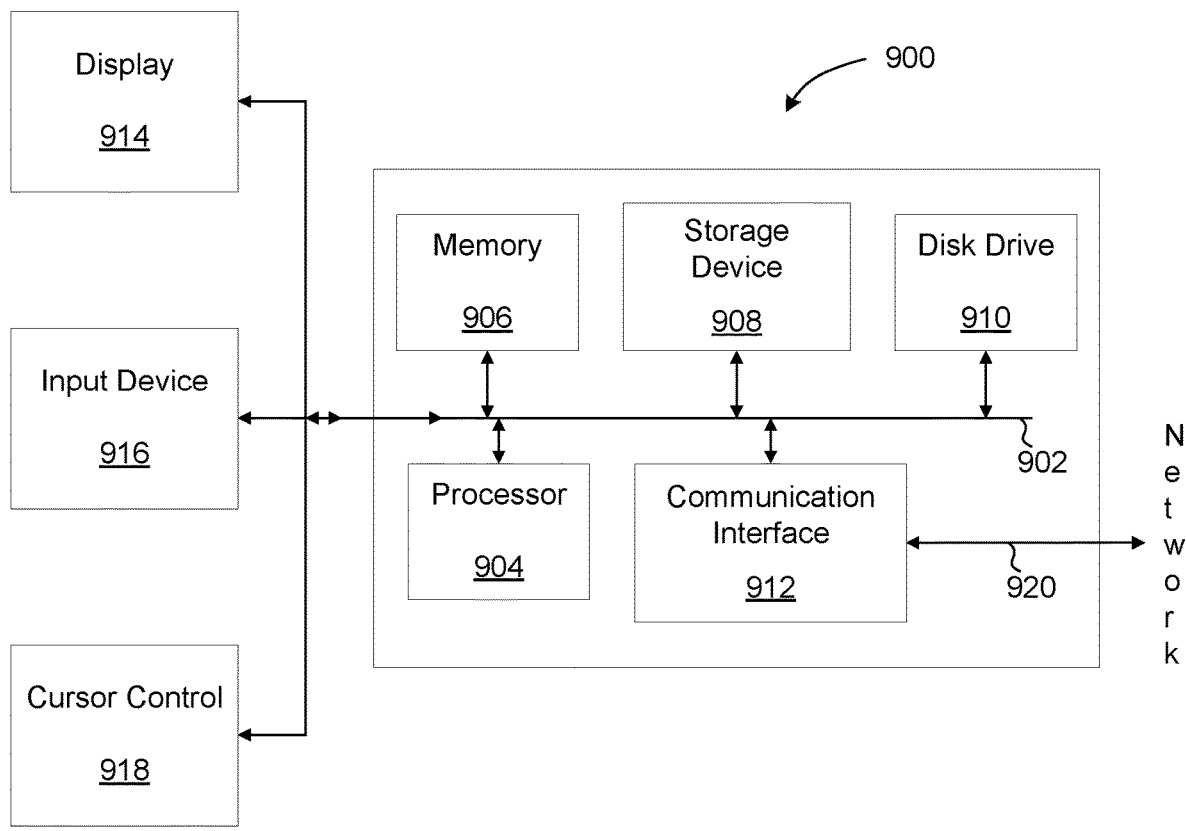
FIG. 9 illustrates an exemplary computing system suitable for software dependency management.

FIG. 9 illustrates an exemplary computing system suitable for software dependency management. In some examples, computer system 900 may be used to implement computer programs, applications, methods, processes, or other software to perform the above-described techniques. Computing system 900 includes a bus 902 or other communication mechanism for communicating information, which interconnects subsystems and devices, such as processor 904, system memory 906 (e.g., RAM), storage device 908 (e.g., ROM), disk drive 910 (e.g., magnetic or optical), communication interface 912 (e.g., modem or Ethernet card), display 914 (e.g., CRT or LCD), input device 916 (e.g., keyboard), cursor control 918 (e.g., mouse or trackball), communication link 920, and network 922.

According to some examples, computing system 800 performs specific operations by processor 904 executing one or more sequences of one or more instructions stored in system memory 906. Such instructions may be read into system memory 906 from another computer readable medium, such as static storage device 908 or disk drive 910. In some examples, hard-wired circuitry may be used in place of or in combination with software instructions for implementation.

The term "computer readable medium" refers to any tangible medium that participates in providing instructions to processor 904 for execution. Such a medium may take many forms, including but not limited to, non-volatile media and volatile media. Non-volatile media includes, for example, optical or magnetic disks, such as disk drive 910. Volatile media includes dynamic memory, such as system memory 906.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 802 for transmitting a computer data signal.

In some examples, execution of the sequences of instructions may be performed by a single computer system 900. According to some examples, two or more computing system 900 coupled by communication link 920 (e.g., LAN, PSTN, or wireless network) may perform the sequence of instructions in coordination with one another. Computing system 900 may transmit and receive messages, data, and instructions, including program, i.e., application code, through communication link 920 and communication interface 912. Received program code may be executed by processor 904 as it is received, and/or stored in disk drive 910, or other non-volatile storage for later execution. In other examples, the above-described techniques may be implemented differently in design, function, and/or structure and are not intended to be limited to the examples described and/or shown in the drawings.

Although the foregoing examples have been described in some detail for purposes of clarity of understanding, the above-described techniques are not limited to the details provided. There are many alternative ways of implementing the above-described invention techniques. The disclosed examples are illustrative and not restrictive.

What is claimed:

1. A method, comprising:
receiving a query of a repository, the repository being configured to store a file identifying a dependency between an application and an update, the query being configured to request retrieval and implementation of the update with the application, the dependency being associated with a program object model file;
parsing the query to identify the update and a version of the update configured to modify the application;
generating automatically a ranking associated with the update and the version using output from a machine-learning module configured to be trained against data received from a data source, the data being associated with a community, and other data retrieved from another data source, the other data being associated with analyzing an issue associated with a prior update;
providing a response to the query including displaying the ranking, the data, and the other data of the prior update;
searching automatically to identify one or more code changes performed to implement data representing a project based on evaluation of prior pull requests;
receiving another query requesting at least one of the update and the version;
retrieving the at least one of the update and the version; and
implementing with the application the at least one of the update and the version, the at least one of the update and the version being retrieved and implemented in response to the another query, the at least one of the update and the version being implemented by writing the at least one of the update and version to source code of the application.

2. The method of claim 1, further comprising:
configuring a user interface to receive the another query after the displaying the ranking, the data, and the other data is performed.

3. The method of claim 1, further comprising:
retrieving the at least one of the update and the version in response to an input.

4. The method of claim 1, further comprising:
retrieving the at least one of the update and the version in response to the another query; and
implementing with the application associated with the dependency the at least one of the update and the version.

5. The method of claim 1, further comprising:
invoking a self-learning loop module when the query is detected, the self-learning loop module being configured to reference one or more files stored in the data source and the another data source, the one or more files including one or more attributes associated with the update.

6. The method of claim 1, further comprising:
invoking a self-learning loop module when the query is detected, the self-learning loop module being configured to reference one or more files stored in the data source and the another data source, the one or more files including one or more attributes associated with the version.

7. The method of claim 1, further comprising:
calling a logic module configured to invoke one or more rules when the query is detected, the one or more rules being associated with the update and the version.

8. The method of claim 1, further comprising:
a self-learning loop module configured to rank the update and the version based on an error rate associated with implementing the update or the version with the application, the error rate being determined during compilation of the source code associated with the application after the update or the version has been implemented.

9. The method of claim 1, wherein the ranking is generated by a ranking module configured to execute one or more ranking algorithms against the update and the version.

10. The method of claim 1, wherein the output comprises further data received from the community, the further data being used to modify the ranking of the update against the version.

11. The method of claim 1, wherein the other data is generated by analyzing the issue, the issue being associated with an implementation of the update before receiving the query.

12. The method of claim 1, wherein the repository is configured to store a file having dependency data associated with the dependency and the application.

13. The method of claim 1, wherein at least one of the one or more attributes is configured to indicate compatibility between the application and the update and the one or more versions.

14. A system, comprising:
a repository configured to store an update and a version of the update, the update and the version being a dependency of an application; and
a processor configured to receive a query of the repository, the repository being configured to store a file identifying the dependency between the application, the update, and the version, the query being configured to request retrieval and implementation of the update with the application, the dependency being associated with a program object model file, to parse the query to identify the update and the version of the update configured to modify the application, to generate automatically a ranking associated with the update and the version using output from a machine-learning module configured to be trained against data received from a data source, the data being associated with a community, and other data retrieved from another data source, the other data being associated with analyzing an issue associated with a prior update, to provide a response to the query including displaying the ranking, the data, and the other data of the prior update, to search automatically to identify one or more code changes performed to implement data representing a project based on evaluation of prior pull requests, to receive another query requesting at least one of the update and the version, to retrieve the at least one of the update and the version, and to implement with the application the at least one of the update and the version, the at least one of the update and the version being retrieved and implemented in response to the another query, the at least one of the update and the version being implemented by writing the at least one of the update and version to source code of the application.

15. The system of claim 14, further comprising a ranking module having one or more algorithms configured to rank the update and the version based on further data received from one or more prior implementations of the update.

16. The system of claim 14, wherein the ranking is generated using attributes configured to indicate compatibility between the update, the version, and the application by evaluating an implementation of the update or the version compiled before the query is received.

17. The system of claim 14, wherein the ranking is generated using an attribute configured to indicate compatibility between the update, the version, and the application.

18. The system of claim 14, further comprising a smart pull request module configured to identify the dependency and another dependency, the another dependency invoking another implementation of another update or another version when the update or the version is implemented with the application in response to the another query.

19. The system of claim 14, wherein an attribute is generated by a self-learning loop module by evaluating an implementation of the update or the version to another application that is configured to perform a substantially similar function to the application, the another application also having substantially similar programmatic structure to the application, the attribute being configured to indicate compatibility between the application and the update and the version.

20. A non-transitory computer readable medium having one or more computer program instructions configured to perform a method, the method comprising:

receiving a query of a repository, the repository being configured to store a file identifying a dependency between an application and an update, the query being configured to request retrieval and implementation of the update with the application, the dependency being associated with a program object model file;

parsing the query to identify the update and a version of the update configured to modify the application;

generating automatically a ranking associated with the update and the version using output from a machine-learning module configured to be trained against data received from a data source, the data being associated with a community, and other data retrieved from another data source, the other data being associated with analyzing an issue associated with a prior update;

providing a response to the query including displaying the ranking, the data, and the other data of the prior update;

searching automatically to identify one or more code changes performed to implement data representing a project based on evaluation of prior pull requests;

receiving another query requesting at least one of the update and the version;

retrieving the at least one of the update and the version; and implementing with the application the at least one of the update and the version, the at least one of the update and the version being retrieved and implemented in response to the another query, the at least one of the update and the version being implemented by writing the at least one of the update and version to source code of the application.

* * * * *